(12) United States Patent
Carvalho

(10) Patent No.: US 7,475,042 B2
(45) Date of Patent: Jan. 6, 2009

(54) PROVISION OF PROTECTED CONTENT FILES VIA PAYMENT SYSTEM

(76) Inventor: Evandro Carvalho, 5521 SW. 20th St., Hollywood, FL (US) 33023

( * ) Notice: Subject to any disclaimer, the term of this patent is extended or adjusted under 35 U.S.C. 154(b) by 13 days.

(21) Appl. No.: 11/639,854

(22) Filed: Dec. 15, 2006

(65) Prior Publication Data

US 2008/0147560 A1    Jun. 19, 2008

(51) Int. Cl.
*G06F 17/60* (2006.01)
(52) U.S. Cl. .............................. 705/59; 705/50; 705/51
(58) Field of Classification Search .................. 705/59, 705/50, 51
See application file for complete search history.

(56) References Cited

U.S. PATENT DOCUMENTS

2001/0032312 A1* 10/2001 Runje et al. ................. 713/172
2004/0117483 A1* 6/2004 Singer et al. ................ 709/225

FOREIGN PATENT DOCUMENTS

JP        2006094342       *  4/2006

* cited by examiner

*Primary Examiner*—Pierre E Elisca
(74) *Attorney, Agent, or Firm*—Mark P. Terry, Esq.; Carey, Rodriguez, Greenberg & Paul, LLP

(57) ABSTRACT

A method on a computer for providing content files to users is disclosed. The method includes establishing a connection with a licensing authority and a payment authority and accepting a connection with a portable data storage apparatus provided by a user. The method further includes providing a catalog of content files to the user and accepting a selection of content files from the user. The method further includes provision of payment by the user to the payment authority. The method further includes receiving a content file from the licensing authority, wherein the content file possesses a first layer of encryption that may be decrypted by authorized players of the content file. The method further includes adding a second layer of encryption to the content file, wherein the second layer of encryption may be decrypted by the portable storage apparatus and storing the content file on the portable storage apparatus.

20 Claims, 3 Drawing Sheets

PROVISION OF PROTECTED CONTENT FILES VIA PAYMENT SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

This invention relates to the field of electronic commerce, and more particularly to the sale of original content using electronic payment systems.

BACKGROUND OF THE INVENTION

As the use of small and/or portable computing devices has increased in recent years, so has the distribution and use of content files, i.e., audio files, video files, software files and game files. Consumers routinely download and play songs on their portable MP3 players and smartphones. Further, garners routinely buy and play video games on their desktop game consoles, handheld fame consoles and smartphones. Many other consumers, however, still purchase content on media (audio CDs, game discs, video DVDs) at physical stores such as audio stores and gaming stores. This can be tedious and time-consuming, as consumers are forced to travel to a physical storefront and transport a tangible media item to the location where they plan to enjoy the content.

The rise of portable computing has also given way to the proliferation of small storage devices. These devices are typically small and light in nature and can store large amounts of data, in the megabyte to gigabyte range. As small storage apparatuses are manufactured in increasing quantities, the prices of these devices have plummeted and the number of small storage devices on the market has increased dramatically. There are multitudes of small flash memory devices, such as USB thumb drives, available on the market and various other devices, such as standard magnetic hard drives, are becoming smaller and less expensive. As a result, these small storage devices are frequently used to transfer data from place to place and computer to computer.

As the use of the Internet has increased over recent years, so has the exchange of information and ideas. File sharing, in particular, has enjoyed increasing popularity over the last few years. However, the growth of the Internet has posed some interesting obstacles in the field of access control of protected content. As users increasingly send and receive files quickly and in great quantities, access control can take a back seat to the free flow of information. Early approaches to the problem involved control over the acquisition of the content. However, this approach lacked the exercise of control over the content once the content was acquired by a user.

Therefore a need exists to overcome the problems with the prior art as discussed above, and particularly for a more efficient way for consumers to place purchased protected content onto a portable media apparatus for transfer to an authorized player of the content.

SUMMARY OF THE INVENTION

Briefly, according to an embodiment of the present invention, a method on a computer for providing content files to users is disclosed. The method includes establishing a connection with a licensing authority and a payment authority and accepting a connection with a portable data storage apparatus provided by a user. The method further includes providing a catalog of content files to the user and accepting a selection of content files from the user. The method further includes providing the user with a statement of cost corresponding to the selection of content files and accepting electronic payment information from the user. The method further includes transmitting the electronic payment information to the payment authority and receiving a payment authorization from the payment authority for the amount of the cost. The method further includes receiving a content file from the licensing authority in response to reception of the payment authorization, wherein the content file possesses a first layer of encryption that may be decrypted by authorized players of the content file. The method further includes adding a second layer of encryption to the content file, wherein the second layer of encryption may be decrypted by the portable storage apparatus and storing the content file on the portable storage apparatus.

In another embodiment of the present invention, a computer system for providing content files to users is disclosed. The computer system includes a touch screen interface for providing a catalog of content files to the user, accepting a selection of content files from the user and providing the user with a statement of cost corresponding to the selection of content files. The computer system further includes a credit card reading mechanism for allowing the user to provide credit card payment information to the computer system and a communications connection for communicatively coupling the computer system with a payment authority and a licensing authority. The computer system further includes a connection terminal for coupling the computer system with a portable storage apparatus. The computer system further includes a processor configured for, transmitting credit card payment information from the user to the payment authority, receiving a payment authorization from the payment authority for the amount of the cost, receiving a content file from the licensing authority in response to reception of the payment authorization, wherein the content file possesses a first layer of encryption that may be decrypted by authorized players of the content file, adding a second layer of encryption to the content file, wherein the second layer of encryption may be decrypted by the portable storage apparatus connected to the computer system and storing the content file on the portable storage apparatus.

In another embodiment of the present invention, a computer readable medium including computer instructions for providing content files to users is disclosed. The computer instructions include instructions for establishing a connection with a licensing authority and a payment authority and accepting a connection with a portable data storage apparatus provided by a user. The computer instructions further include instructions for providing a catalog of content files to the user and accepting a selection of content files from the user. The computer instructions further include instructions for providing the user with a statement of cost corresponding to the selection of content files and accepting electronic payment information from the user. The computer instructions further include instructions for transmitting the electronic payment information to the payment authority and receiving a payment authorization from the payment authority for the amount of the cost. The computer instructions further include instructions for receiving a content file from the licensing authority in response to reception of the payment authorization, wherein the content file possesses a first layer of encryption that may be decrypted by authorized players of the content file. The computer instructions further include instructions for adding a second layer of encryption to the content file, wherein the second layer of encryption may be decrypted by the portable storage apparatus and storing the content file on the portable storage apparatus.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

The present invention provides a method, system and computer readable medium on a computer for providing content files to users. The method includes establishing a connection with a licensing authority and a payment authority and accepting a connection with a portable data storage apparatus provided by a user. The method further includes providing a catalog of content files to the user and accepting a selection of content files from the user. The method further includes providing the user with a statement of cost corresponding to the selection of content files and accepting electronic payment information from the user. The method further includes transmitting the electronic payment information to the payment authority and receiving a payment authorization from the payment authority for the amount of the cost. The method further includes receiving a content file from the licensing authority in response to reception of the payment authorization, wherein the content file possesses a first layer of encryption that may be decrypted by authorized players of the content file. The method further includes adding a second layer of encryption to the content file, wherein the second layer of encryption may be decrypted by the portable storage apparatus and storing the content file on the portable storage apparatus.

Figure 1:
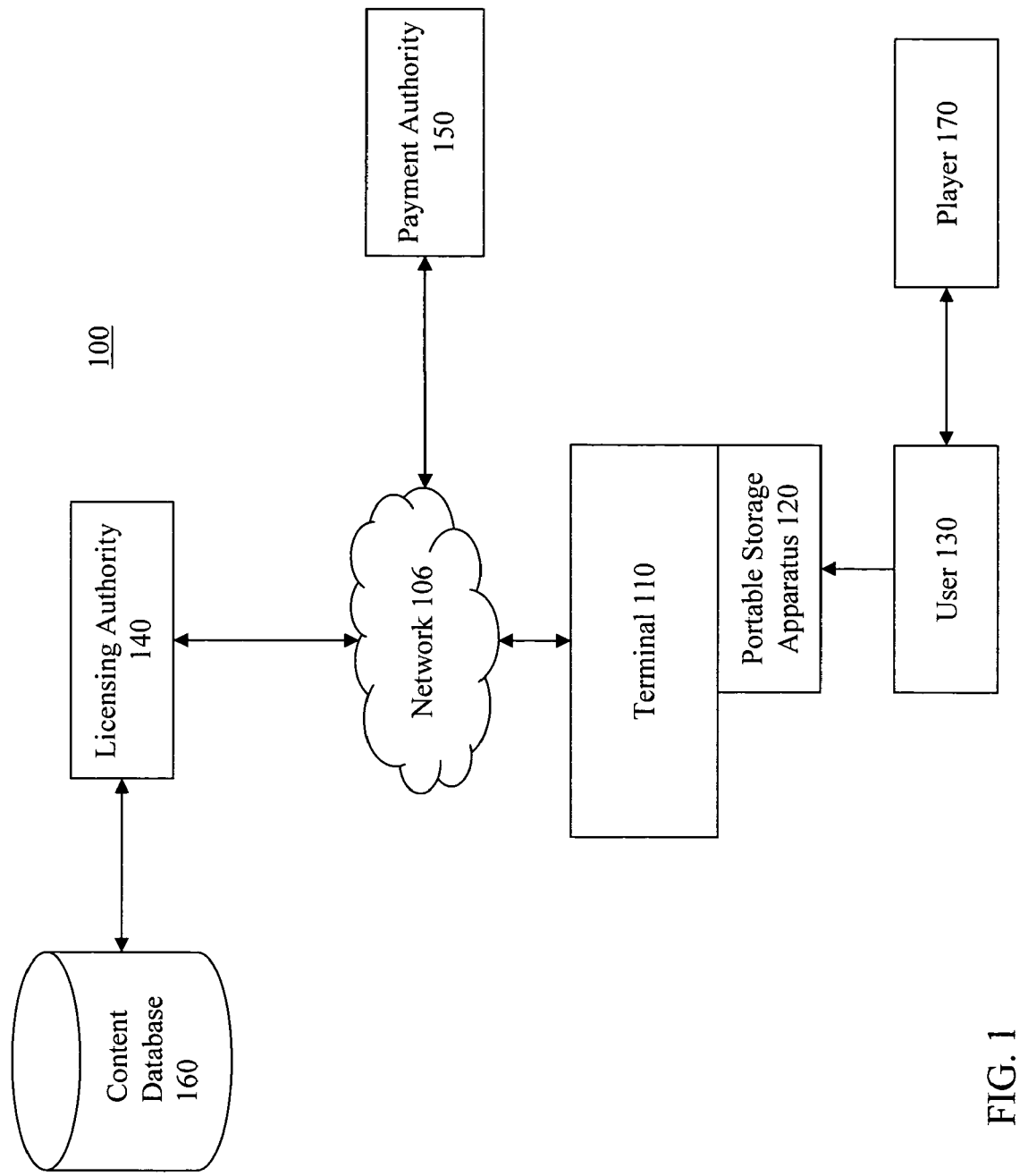
FIG. 1 is a block diagram illustrating the overall system architecture of an embodiment of the present invention.

FIG. 1 is a block diagram illustrating the overall architecture of one embodiment of the present invention. The exemplary embodiments of the present invention adhere to the system architecture of FIG. 1. FIG. 1 shows an embodiment of the present invention wherein a user 130 can interact with a content management system 100 via a terminal 110, wherein the content management system 100 may exist in an enterprise or client-server implementation that services multiple users and terminals in more than one location. It should be noted that although FIG. 1 shows only one user 130 and one terminal 110, the system of the present invention supports any number of users and terminals.

FIG. 1 also shows a content management system 100 consisting of a licensing authority 140, a payment authority 150 and a content database 160. The licensing authority 140 and payment authority 150, described in more detail with reference to the figures below, are connected to the network 106. Also shown is player 170, which represents any commercially available player of content files, such as a personal computer, a CD player, a DVD player, a smart phone, a game console, an MP3 player or any combination of the above.

In an embodiment of the present invention, the computer systems of portable storage apparatus 120, player 170, terminal 110, licensing authority 140, and payment authority 150 are one or more Personal Computers (PCs), Personal Digital Assistants (PDAs), hand held computers, palm top computers, lap top computers, smart phones, game consoles or any other information processing devices. A PC can be one or more IBM or compatible PC workstations running a Microsoft Windows or LINUX operating system, one or more Macintosh computers running a Mac OS operating system, or an equivalent. In another embodiment, the computer systems of portable storage apparatus 120, player 170, terminal 110, licensing authority 140, and payment authority 150 are a server system, such as SUN Ultra workstations running a SunOS operating system or IBM RS/6000 workstations and servers running the AIX operating system. The computer systems of portable storage apparatus 120, player 170, terminal 110, licensing authority 140, and payment authority 150 are described in greater detail below with reference to FIG. 3.

In an embodiment of the present invention, the network 106 is a circuit switched network such as the public switched telephone system or a private telephone system. In another embodiment, the network 106 is a packet switched network. The packet switched network is a wide area network (WAN), such as the global Internet (or the World Wide Web), a private WAN, a local area network (LAN), a telecommunications network or any combination of the above-mentioned networks. In yet another embodiment, the structure of the network 106 is a wired network, a wireless network, a broadcast network or a point-to-point network.

The licensing authority 140 comprises a computer or computer system that manages the transfer of content files from the content database 160 to the terminal 110 and ultimately to the portable storage apparatus 120 of the user 130. Before transfer of the content file to the terminal 110, the licensing authority 140 communicates with the payment authority 150 in order to determine whether payment for the content file has been effectuated. The licensing authority 140 further communicates with the terminal 110 in order to determine which content file(s) the user 130 desires to purchase. Messages transferred between the licensing authority 140, the terminal 110 and the payment authority 150 can comprise any one of email messages, a hyper text transfer protocol (HTTP) request, a transmission control protocol/internet protocol (TCP/IP) request, a file transfer protocol (FTP) request and an electronic data interchange (EDI) request.

The content database 160 is a repository for content files handled by the content management system 100. The content database 160 can be any commercially database, such as an Oracle Database, Enterprise or Personal Edition, available from Oracle Corporation, or a Microsoft SQL Server or Access 2000 database available from Microsoft Corporation.

A content file can include any type of file that includes content for viewing, hearing or general enjoyment, such as an audio file, a video file, a software file or a game file for playing on a game console or other small computing device. Examples of audio file types supported by the content database are any compressed or uncompressed file formats such as WAV, AIFF, AU, Windows Media Audio (WMA), MP3, and AAC. Examples of video file types supported by the content database are any compressed or uncompressed file formats such as Quicktime, WMV, MPEG, MPEG-4, MOV, RealMedia, AVI, WMA, and DivX. Examples of game file types supported by the content database are XBE, Microsoft. Xbox game file format, Sony PlayStation fame file format and Nintendo game file format.

The content database 160 may include a database management system, which is an application that controls the organization, storage and retrieval of data (fields, records and files) in database 160. The database management system accepts requests for data from the content management system 100 and instructs the operating system to transfer the appropriate data. The database management system may also control the security and integrity of the database 160. Data security prevents unauthorized users from viewing or updating certain portions of the database 160. The database management system can be any commercially database management system, such as the Oracle E-Business Suite available from Oracle Corporation.

The payment authority 150 manages the payment of fees or other monies for the purchase of content files. The payment authority 150 can interface with the licensing authority 140 so as to confirm payment for the content file that shall be transferred to the portable storage apparatus 120.

In one embodiment of the present invention, the payment authority 150 is a payment gateway, which is an e-commerce Application Service Provider (ASP) service that authorizes payments for e-businesses, online retailers, or traditional brick and mortar businesses. A payment gateway is the equivalent of a physical point-of-sale terminal located in most retail outlets. Payment gateways encrypt sensitive information, such as credit card numbers, to ensure that information passes securely between the customer and the merchant. A payment gateway facilitates the transfer of information between a payment portal (such as a website) and the acquiring bank, quickly and securely. When a customer orders a product from a payment gateway enabled merchant, the payment gateway performs a variety of tasks to process the transaction. Payment gateways accept payment via the use of credit cards, charge cards, bank cards, gift cards, account cards, etc.

The terminal 110 comprises a computer or computer system that comprises a variety of tasks. In one embodiment of the present invention, the terminal 110 includes a touch screen that is used to provide the user 130 with a list of content files to choose from, such as a catalog of content files. The touch screen can further be used to allow the user 130 to browse the content files and select those files that he desires to purchase for download. The touch screen can comprise any one of resistive touch screens, surface wave touch screens, capacitive touch screens, infrared touch screens, strain gauge touch screens, optical imaging touch screens, dispersive signal technology touch screens and acoustic pulse recognition touch screens.

In another embodiment of the present invention, the terminal 110 includes a credit card reading mechanism for garnering electronic payment information from a credit card, gift card, account card, or other type of card for transferring funds to a vendor. One alternative to the credit card reading mechanism is a cash entry module that accepts the entry of coins or paper currency. In this alternative, the payment authority 150 resides on the terminal 110 and the functions of the two are integrated.

In another embodiment of the present invention, the terminal 110 includes a connection terminal that comprises a physical connection for conductively coupling the terminal 110 with the portable storage apparatus 120. In this embodiment, the connection terminal may conforms to any one of the following interface standards: (Universal Serial Bus) USB, IEEE 1394, and RS-232 serial. In another embodiment of the present invention, the terminal 110 includes a connection method that comprises a wireless connection for wirelessly coupling the terminal 110 with the portable storage apparatus 120. In this embodiment, the connection method may conforms to any one of the following wireless protocols: IEEE 802.13.1, IEEE 802.11 and IrDA.

The portable storage apparatus 120 is a small, portable storage device for physically transferring the content files between the terminal 110 and the player 170. The portable storage apparatus 120 may comprises any one of a hard drive, such as a standard magnetic or optical drive, a flash memory drive, a flash memory card, a floppy disk, a CD, a DVD and an optical disc. Furthermore, the portable storage apparatus 120 may be a part of a small computing apparatus, such as an MP3 player, a smartphone, a cellular phone, a digital camera, a personal digital assistant, a palmtop computer, a handheld computer, a portable gaming device or any combination of the above.

In one embodiment of the present invention, the mechanism by which the computers of portable storage apparatus 120, terminal 110 and payment authority 150 interact with the licensing authority 140 of content management system 100 is a client application residing on the respective computer. These client applications can comprise any one of a C++ program, a Visual Basic program, a Java applet, a Java scriptlet, a Java script, a Perl script, an Active X control or any self-sufficient application executing on a user computer. The user 130 can communicate with the content management system 100 via terminal 110 via a Web interface such as a commercially available Web browser, e.g., Netscape Navigator and Microsoft Internet Explorer.

It should be noted that in the embodiment of the present invention described above, the computers of licensing authority 140, portable storage apparatus 120, terminal 110 and payment authority 150 are depicted as separate. In this embodiment, the separate computers communicate with each other over a network 106 or other communication medium. In an alternative embodiment of the present invention, any number or all of the computers of licensing authority 140, portable storage apparatus 120, terminal 110 and payment authority 150 can be integrated within a content management system. In this alternative embodiment, those modules or clients that are integrated share the same resources.

Figure 2:
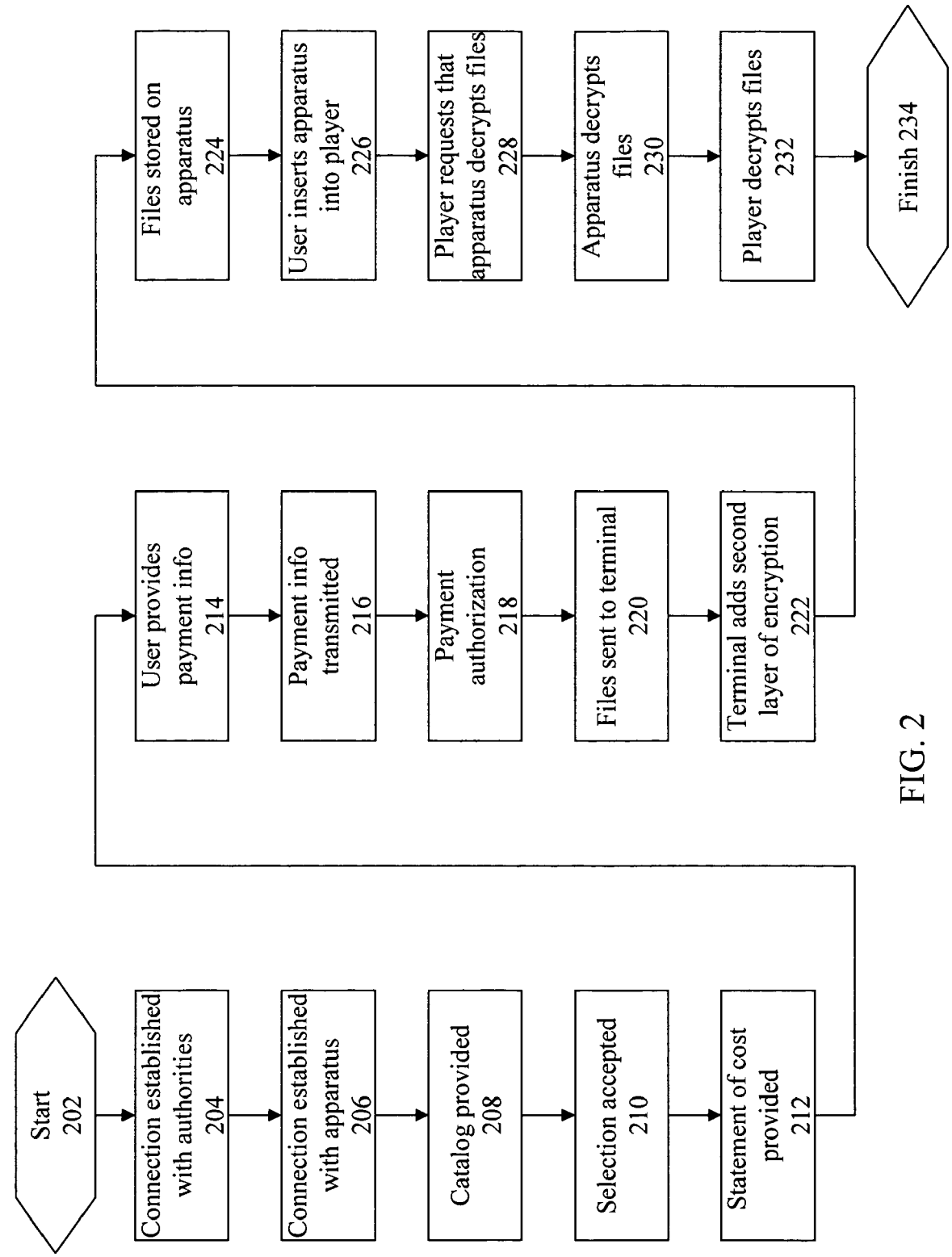
FIG. 2 is a flowchart depicting the operation and control flow of the content transport process, in one embodiment of the present invention.

FIG. 2 is a flowchart depicting the operation and control flow of the content transport process, in one embodiment of the present invention. The flow chart of FIG. 2 depicts the process by which a content file is purchased or rented by a user 130 from the licensing authority 140 via the terminal 110 and stored on a portable storage apparatus 120 for later play on a player 170. The control flow of the flowchart of FIG. 2 begins with step 202 and proceeds directly to step 204. In step 204, the terminal 110 establishing a connection with the licensing authority 140 and the payment authority 150. This may comprise the establishment of an Internet connection via network 106 or the establishment of a POTS connection via network 106.

In step 206, the terminal 110 accepts a connection with the portable data storage apparatus 120 provided by a user 130. The establishment of this connection may comprise a physical connection for conductively coupling the terminal 110 with the portable storage apparatus 120 or may comprise a wireless connection for wirelessly coupling the terminal 110 with the portable storage apparatus 120. In step 208, the terminal 110 provides a catalog of content files to the user 130. The terminal 110 may accomplish this step by providing the catalog information via a touch screen or other display device.

In step 210, the terminal 110 accepts a selection of content files from the user 130. The terminal 110 may accept this selection via inputs from the user 130 via a touch screen, a keyboard, a mouse or other input device. The user 130 may choose one or more audio files, video files, software files or game files for download. Among the various selections provided to the user 130 are 1) upgrades for software files, such as software patches, upgrade modules or service packs for user applications, and 2) subtitles in various languages for movie or video files.

In step 212, the terminal 110 provides the user 130 with a statement of cost corresponding to the selection of content files. In this step, the terminal 110 presents via a touch screen or other display device a list of content files selected by the user 130 and a summary of costs (including applicable taxes and other tariffs or fees) associated with the selection.

In step 214, the terminal 110 accepts electronic payment information from the user 130 such as by allowing the user 130 to insert a credit card through a credit card reading mechanism. Alternatively, the user 130 may enter credit card payment information into the terminal 110 via an input mechanism such as a touch screen, keyboard or mouse. In step 216, the terminal 110 transmits the electronic payment information to the payment authority 150. In step 218, the terminal 110 receives a payment authorization from the payment authority 150 for the amount of the cost.

In step 220, in response to the payment authorization, the licensing authority 140 sends the selected content files to the terminal 110. The selected content files possess a first layer of encryption that may be decrypted by authorized players of the content file. The first layer of encryption uses a cipher for which a corresponding key is possessed by authorized players of the selected content files. That is, authorized players of the selected content files can decrypt the first layer of encryption so as to allow playing of the selected content files on a player 170.

In one embodiment of the present invention, popular content files and/or content files that have already been received by the terminal 110 remain on terminal 110. In this embodiment, future users 130 desiring to purchase a content file that already resides on terminal 110 have the benefit of receiving the content file directly from terminal 110, thereby eliminating the need to download the content file from step 220 and reducing the amount of time necessary to effectuate a purchase.

In step 222, the terminal 110 adds a second layer of encryption to the content file, wherein the second layer of encryption may be decrypted by the portable storage apparatus 120. The second layer of encryption uses a cipher for which a corresponding key is possessed by the portable storage apparatus 120. That is, the portable storage apparatus 120 can decrypt the second layer of encryption.

In step 224, the terminal 110 stores the selected content files on the portable storage apparatus 120. In step 226, the user 130 removes the portable storage apparatus 120 from the terminal 110 and inserts it into the player 170. In step 228, before transfer of the selected content files to the player 170 or before the player 170 attempts to decrypt the selected content files for play, the player 170 requests that the portable storage apparatus 120 decrypt the second layer of encryption. In step 230, a hardware or software component on the portable storage apparatus 120 decrypts the second layer of encryption. In step 232, the player 170 decrypts the first layer of encryption and then plays the selected content files. In step 234, the control flow of FIG. 2 ceases.

In one alternative to step 226, the user 130 instructs the portable storage apparatus 120 to play the content file. In the next step, since the portable storage apparatus 120 acts as the player 170 in this embodiment, a hardware or software component on the portable storage apparatus 120 decrypts the second layer of encryption. Next, the portable storage apparatus 120 decrypts the first layer of encryption and then plays the selected content files.

In one embodiment of the present invention, if the user 130 decides to rent the selected content files, the player 170 or the portable storage apparatus 120 may include computer instructions that destroy, erase or otherwise make inaccessible the selected content files after the expiration date of the rental. In another embodiment of the present invention, the user 130 is given an option to choose a content file that includes advertising. For example, an audio file can include audio commercials or a video file may include video or audio commercials embedded in the content file such that the user 130 experiences the commercials during the play of the content file. Alternatively, commercials can be experienced by the user 130 while a content file is paused or while the player 170 is in sleep mode. In this embodiment, the user 130 may be charged a lesser amount for the content file in exchange for choosing this option.

In another embodiment of the present invention, a new commercial or commercials are downloaded onto the portable storage apparatus 120 each time the unit is connected to the terminal 110. This allows for differing and varied commercials to be experienced by the user 130 after each time the unit is connected to the terminal 110.

The present invention can be realized in hardware, software, or a combination of hardware and software in the system described in FIG. 1. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allows a computer system to read such computer readable information.

Figure 3:
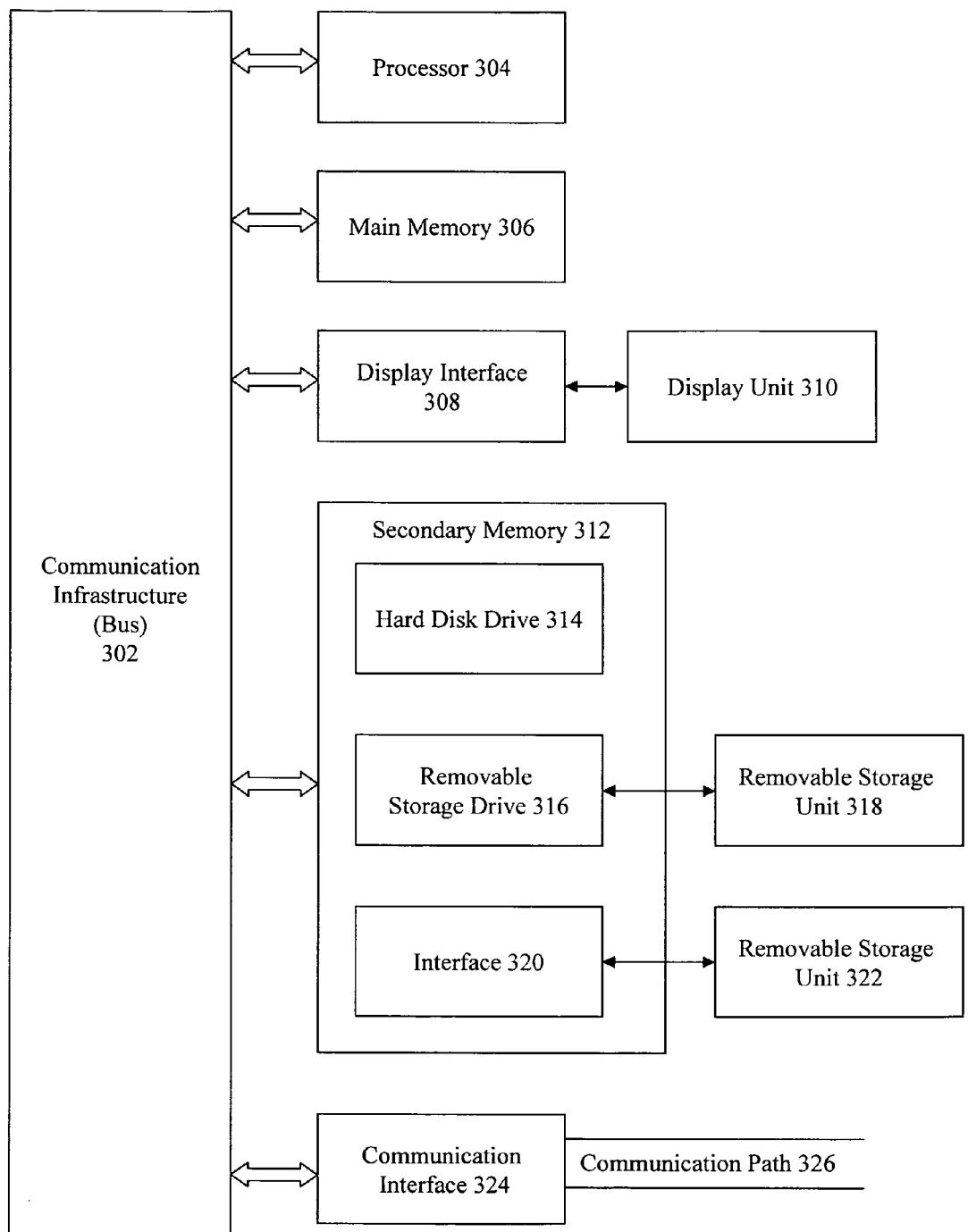
FIG. 3 is a block diagram showing a computer useful for implementing one embodiment of the present invention.

FIG. 3 is a block diagram of a computer system useful for implementing an embodiment of the present invention. The computer system of FIG. 3 is a more detailed representation of the computers of the content management system 100 of the present invention. The computer system of FIG. 3 includes one or more processors, such as processor 304. The processor 304 is connected to a communication infrastructure 302 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 308 that forwards graphics, text, and other data from the communication infrastructure 302 (or from a frame buffer not shown) for display on the display unit 310. The computer system also includes a main memory 306, preferably random access memory (RAM), and may also include a secondary memory 312. The secondary memory 312 may include, for example, a hard disk drive 314 and/or a removable storage drive 316, representing a floppy disk drive, a magnetic tape drive, an optical disk drive, etc. The removable storage drive 316 reads from and/or writes to a removable storage unit 318 in a manner well known to those having ordinary skill in the art. Removable storage unit 318, represents, for example, a floppy disk, magnetic tape, optical disk, etc. which is read by and written to by removable storage drive 316. As will be appreciated, the removable storage unit 318 includes a computer usable storage medium having stored therein computer software and/or data.

In alternative embodiments, the secondary memory 312 may include other similar means for allowing computer programs or other instructions to be loaded into the computer system. Such means may include, for example, a removable storage unit 322 and an interface 320. Examples of such may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to the computer system.

The computer system may also include a communications interface 324. Communications interface 324 allows software and data to be transferred between the computer system and external devices. Examples of communications interface 324 may include a modem, a network interface (such as an Ethernet card), a communications port, a PCMCIA slot and card, etc. Software and data transferred via communications interface 324 are in the form of signals which may be, for example, electronic, electromagnetic, optical, or other signals capable of being received by communications interface 324. These signals are provided to communications interface 324 via a communications path (i.e., channel) 326. This channel 326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 306 and secondary memory 312, removable storage drive 316, a hard disk installed in hard disk drive 314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allows a computer to read such computer readable information.

Computer programs (also called computer control logic) are stored in main memory 306 and/or secondary memory 312. Computer programs may also be received via communications interface 324. Such computer programs, when executed, enable the computer system to perform the features of the present invention as discussed herein. In particular, the computer programs, when executed, enable the processor 304 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

I claim:

1. A method on a computer for providing content files to users, comprising:

establishing a connection with a licensing authority and a payment authority;

accepting a connection with a portable data storage apparatus provided by a user;

providing a catalog of content files to the user;

accepting a selection of content files from the user;

accepting from the user an acceptance of advertising in the selection of content files;

providing the user with a statement of cost corresponding to the selection of content files, wherein the cost of the selection of content files is reduced due to the acceptance of advertising;

accepting electronic payment information from the user;

transmitting the electronic payment information to the payment authority;

receiving a payment authorization from the payment authority for the amount of the cost;

receiving a content file from the licensing authority in response to reception of the payment authorization, wherein the content file possesses a first layer of encryption for decryption by authorized players of the content file and wherein the content file includes advertising that is viewed by the user during playback of the content file;

adding a second layer of encryption to the content file, wherein the second layer of encryption is decrypted by the portable storage apparatus; and storing the content file on the portable storage apparatus.

2. The method of claim 1, wherein the method for providing content files to users comprises providing any one of audio files, video files, software files and game files to users.

3. The method of claim 2, wherein the first step of accepting comprises:

identifying a connection with a portable storage apparatus conductively connected to the computer by the user.

4. The method of claim 3, wherein the second step of accepting comprises:

accepting a content file selection from the user via a touch screen display.

5. The method of claim 4, wherein the third step of accepting comprises:

garnering electronic payment information from a user credit card that is swiped through a credit card reading mechanism coupled to the computer.

6. The method of claim 3, wherein the second step of receiving comprises:

receiving a content file from the licensing authority in response to reception of the payment authorization, wherein the content file possesses a first layer of encryption using a cipher for which a corresponding key is possessed by authorized players of the content file and wherein the content file includes advertising that is played for the user when the portable storage apparatus is in sleep mode.

7. The method of claim 6, wherein the step of adding comprises:

adding a second layer of encryption to the content file, wherein the second layer of encryption uses a cipher for which a corresponding key is possessed by the portable storage apparatus.

8. A computer system for providing content files to users, comprising:

a touch screen interface for providing a catalog of content files to the user, accepting a selection of content files from the user, accepting from the user an acceptance of advertising in the selection of content files and providing the user with a statement of cost corresponding to the selection of content files, wherein the cost of the selected content file is reduced due to the acceptance of advertising;

a credit card reading mechanism for reading credit card payment information from the user;

a communications connection for communicatively coupling the computer system with a payment authority and a licensing authority;

a connection terminal for coupling the computer system with a portable storage apparatus; and a processor configured for:

transmitting the credit card payment information to the payment authority;

receiving a payment authorization from the payment authority for the amount of the cost;

receiving a content file from the licensing authority in response to reception of the payment authorization, wherein the content file possesses a first layer of encryption for decryption by authorized players of the content file and wherein the content file includes advertising that is viewed by the user during playback of the content file;

adding a second layer of encryption to the content file, wherein the second layer of encryption is decrypted by the portable storage apparatus connected to the computer system; and storing the content file on the portable storage apparatus.

9. The computer system of claim 8, wherein a content file comprises at least one of audio files, video files, software files and game files.

10. The computer system of claim 9, wherein the touch screen comprises any one of resistive touch screens, surface wave touch screens, capacitive touch screens, infrared touch screens, strain gauge touch screens, optical imaging touch screens, dispersive signal technology touch screens and acoustic pulse recognition touch screens.

11. The computer system of claim 10, wherein the communications connection comprises any one of a POTS telephone connection, a cellular telephone connection, a high speed wired internet connection, and a high speed wireless internet connection.

12. The computer system of claim 11, wherein the connection terminal comprises any one of a physical connection for conductively coupling the computer system with the portable storage apparatus and a wireless connection for wirelessly coupling the computer system with the portable storage apparatus.

13. The computer system of claim 12, wherein the connection terminal conforms to any one of the following interface standards: USB, IEEE 1394, IEEE 802.13.1, IEEE 802.11 and IrDA.

14. The computer system of claim 13, wherein the portable storage apparatus comprises any one of a hard drive, a flash memory drive, a CD, a DVD.

15. The computer readable medium of claim 13, wherein the instructions for providing content files to users comprise instructions for providing any one of audio files, video files, software files and game files to users.

16. The computer readable medium of claim 15, wherein the first instructions for accepting comprise instructions for:

identifying a connection with a portable storage apparatus conductively connected to the computer by the user.

17. The computer readable medium of claim 16, wherein the second instructions for accepting comprise instructions for:

allowing the user to select at least one content file via a touch screen display.

18. The computer readable medium of claim 17, wherein the third instructions for accepting comprise instructions for:

garnering electronic payment information from a user credit card that is swiped through a credit card reading mechanism coupled to the computer.

19. The computer readable medium of claim 18, wherein the second instructions for receiving comprise instructions for:

receiving a content file from the licensing authority in response to reception of the payment authorization, wherein the content file possesses a first layer of encryption using a cipher for which a corresponding key is possessed by authorized players of the content file and wherein the content file includes advertising that is played for the user when the portable storage apparatus is in sleep mode.

20. A computer readable medium including computer instructions for providing content files to users, the computer instructions including instructions for:

establishing a connection with a licensing authority and a payment authority;

accepting a connection with a portable data storage apparatus provided by a user;
providing a catalog of content files to the user;
accepting a selection of content files from the user;
accepting from the user an acceptance of advertising in the selection of content files;
providing the user with a statement of cost corresponding to the selection of content files, wherein the cost of the selection of content files is reduced due to the acceptance of advertising;
accepting electronic payment information from the user;
transmitting the electronic payment information to the payment authority;
receiving a payment authorization from the payment authority for the amount of the cost;
receiving a content file from the licensing authority in response to reception of the payment authorization, wherein the content file possesses a first layer of encryption for decryption by authorized players of the content file and wherein the content file includes advertising that is viewed by the user during playback of the content file;
adding a second layer of encryption to the content file, wherein the second layer of encryption is decrypted by the portable storage apparatus; and
storing the content file on the portable storage apparatus.

* * * * *